(12) United States Patent
Maeda et al.

(10) Patent No.: US 6,831,721 B2
(45) Date of Patent: Dec. 14, 2004

(54) LIQUID CRYSTAL DISPLAY AND ELECTRONIC APPARATUS INCORPORATING THE LIQUID CRYSTAL DISPLAY

(75) Inventors: Tsuyoshi Maeda, Yamanaski-Ken (JP); Osamu Okumura, Chino (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/948,428

(22) Filed: Sep. 12, 2001

(65) Prior Publication Data

US 2002/0054260 A1 May 9, 2002

(30) Foreign Application Priority Data

Nov. 7, 2000 (JP) ........................................ 2000-339396

(51) Int. Cl.$^7$ ............................................ G02F 1/1335
(52) U.S. Cl. ........................ 349/117; 349/113; 349/118; 349/121
(58) Field of Search ................................ 349/113, 117, 349/118, 119, 121

(56) References Cited

U.S. PATENT DOCUMENTS 6,295,109 B1 * 9/2001 Kubo et al. .................. 349/119
6,597,418 B2 * 7/2003 Moon et al. .................. 349/98

FOREIGN PATENT DOCUMENTS

| JP | 3-105318 | 5/1991 |
| JP | A 9-506985 | 7/1997 |
| JP | A 10-319235 | 12/1998 |
| JP | A-2000-56294 | 2/2000 |
| WO | WO99/40479 | 8/1999 |

* cited by examiner

Primary Examiner—Tarifur R. Chowdhury
Assistant Examiner—David Chung
(74) Attorney, Agent, or Firm—Oliff & Berridge, PLC

(57) ABSTRACT

The invention provides a transflective color liquid crystal display that provides a light transmissive display and reduces power consumption without reducing the brightness of the reflective display. In the liquid crystal display with a liquid crystal layer disposed between a pair of substrates, a reflective display unit and a transmissive display unit are formed in one pixel, and a retardation layer including a polymer liquid crystal and having a retardation of roughly ¼ wavelength is formed in the transmissive display unit.

8 Claims, 7 Drawing Sheets

[FIG. 1]
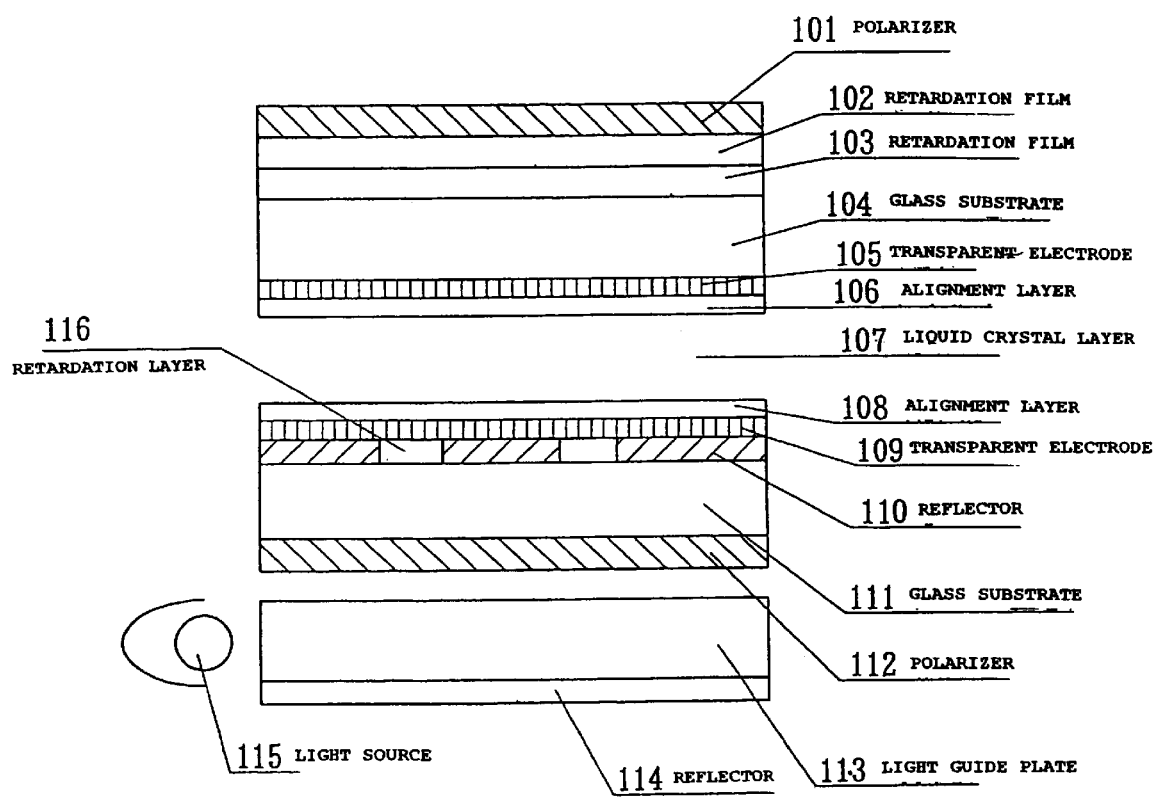

[FIG. 2]
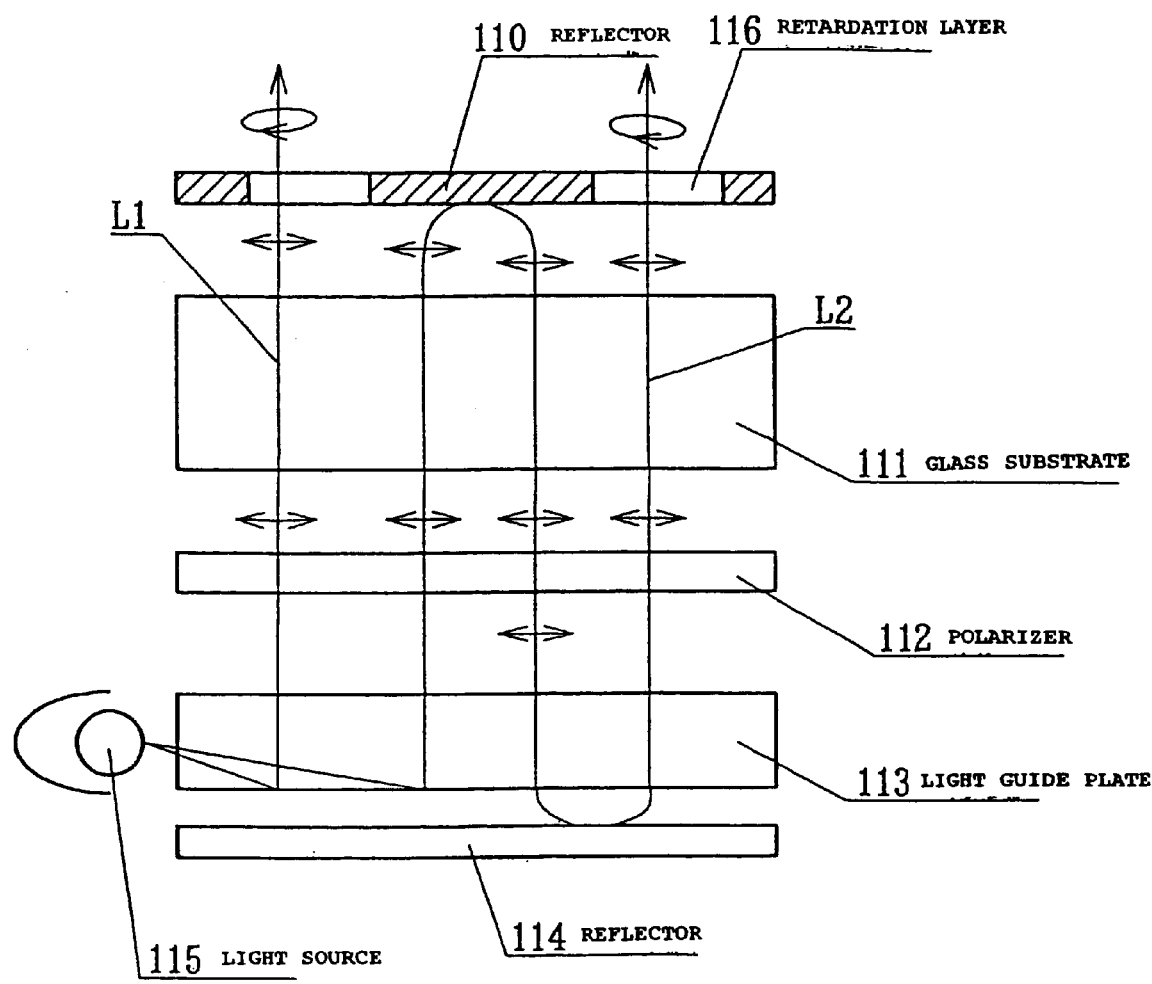

[FIG. 3]
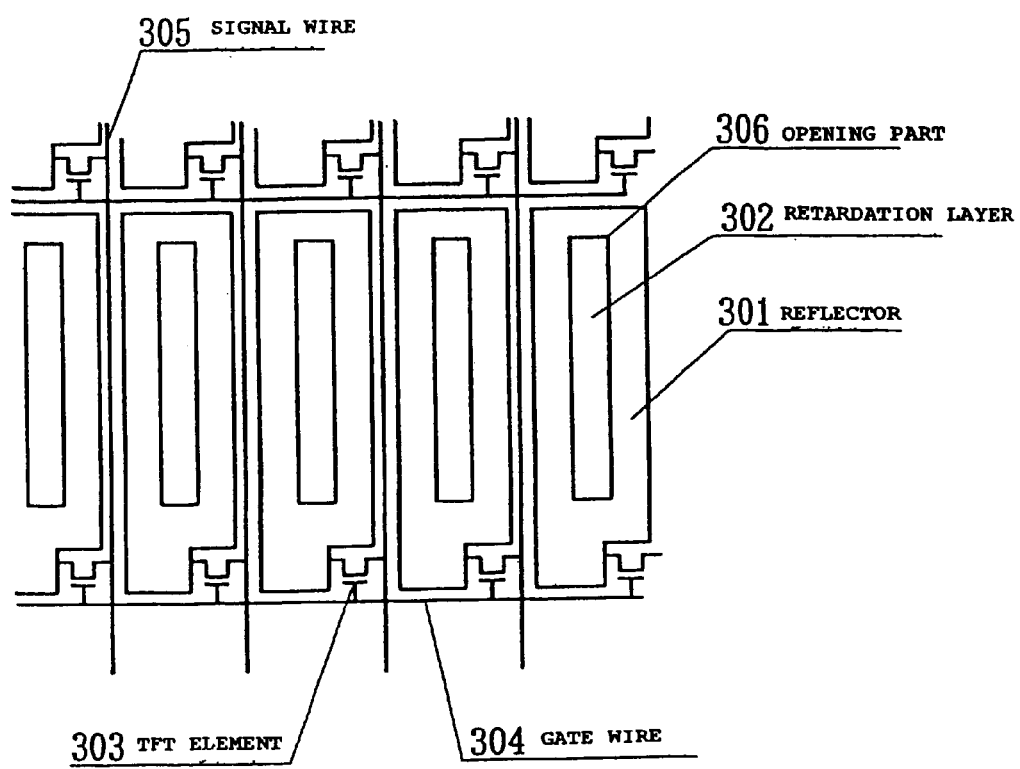

[FIG. 4]
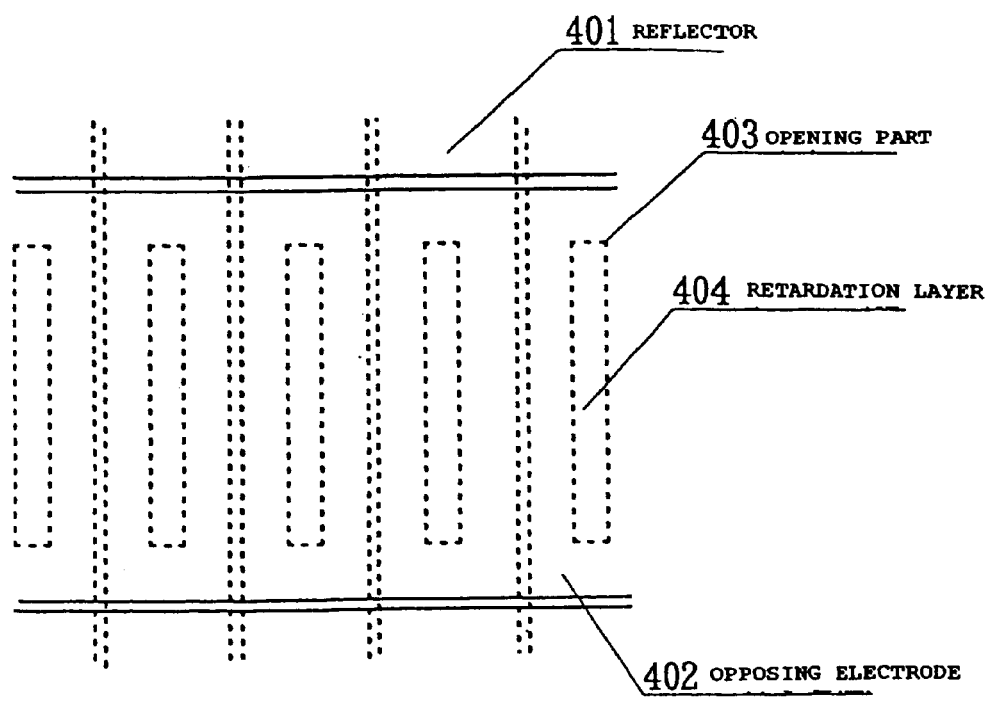

[FIG. 5]
(a) 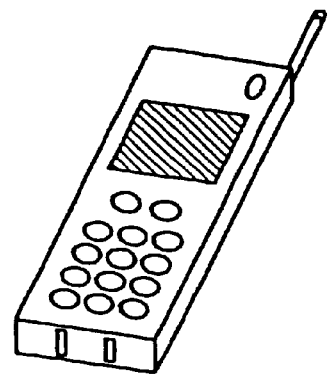
(b) 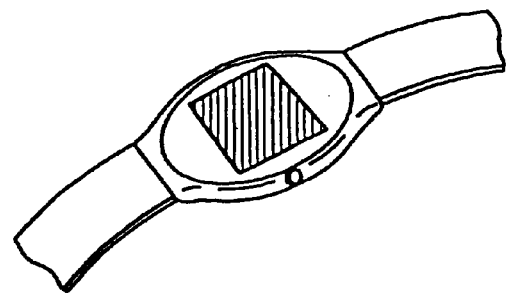
(c) 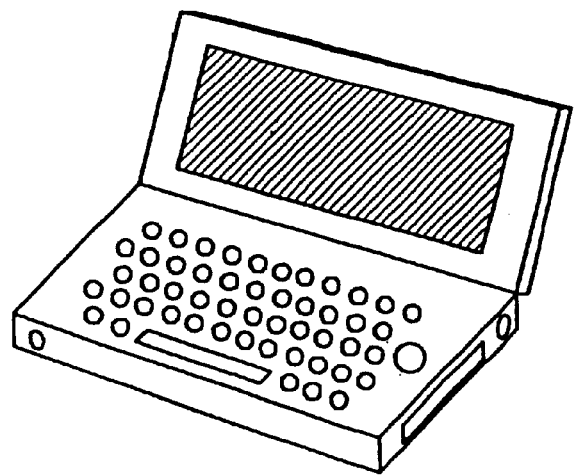

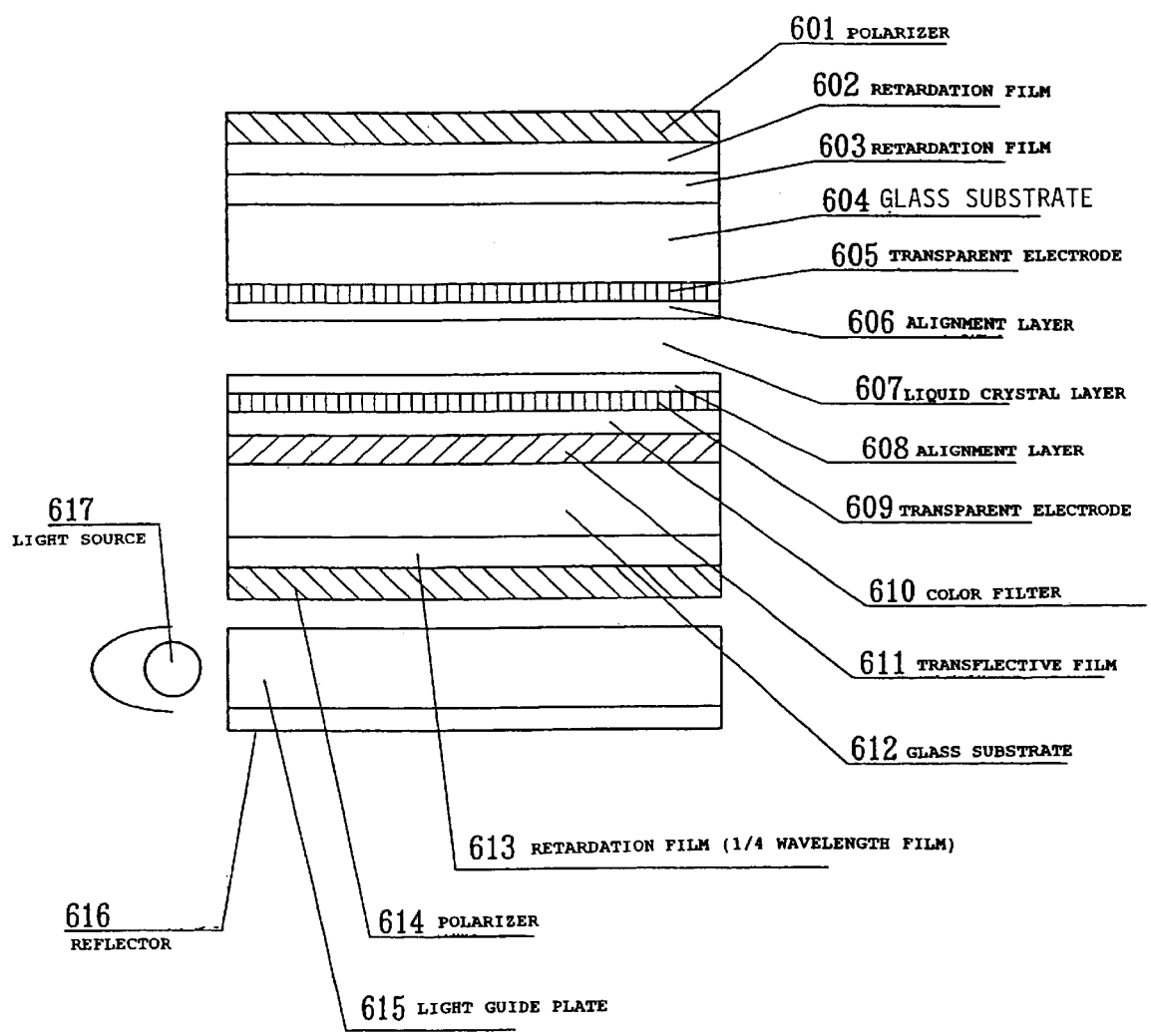
[FIG. 6]

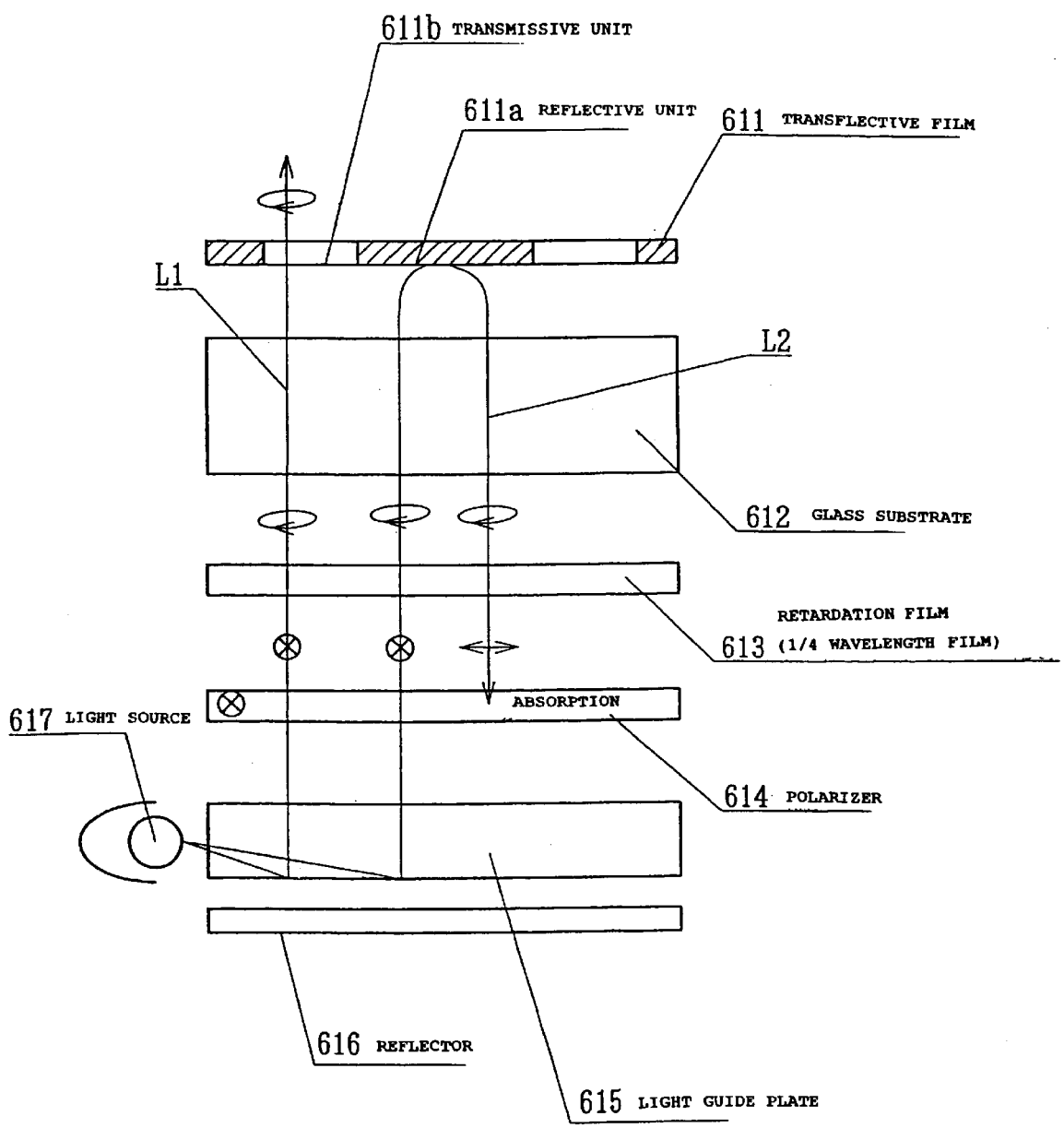
[FIG. 7]

LIQUID CRYSTAL DISPLAY AND ELECTRONIC APPARATUS INCORPORATING THE LIQUID CRYSTAL DISPLAY

BACKGROUND OF THE INVENTION

1. Field of Invention

The present invention relates to a liquid crystal display and an electronic apparatus that incorporates the liquid crystal display, and more specifically, the invention relates to a transflective liquid crystal display.

2. Description of Related Art

Reflective liquid crystal displays have been employed as display units or the like in portable electronic apparatus. A problem occurs in that the display is difficult to see in a dark location, since the display relies on use of external light, such as natural light and artificial light. Thus, liquid crystal displays, which use external light in a bright place in the same way as general reflective liquid crystal displays, can still be used in a dark place by using a light of an illuminating device (hereinafter, referred to as a "backlight") on the reverse side of a liquid crystal cell. These displays are referred to as transflective liquid crystal displays.

A transflective liquid crystal display can be provided by, for example, converting a reflective liquid crystal display having an external reflector. This is accomplished by replacing a conventional reflector that has only a reflective function with a "transflective film" that has both a light transmissive function and a light reflective function. The transflective film can include a material with fine pearl pigments mixed therein, a metal film having an aperture for light transmission, or a metal film of very small thickness.

In addition, in recent years, as portable apparatus and OA (Office Automation) apparatus have been developed, there has been a growing demand for color liquid crystal displays. An even greater demand has been experienced for color liquid crystal displays and apparatus using reflective liquid crystal displays. However, when simply combining the transflective liquid crystal display of the above configuration with a color filter, the transflective film is disposed on the outer surface of the liquid crystal cell, and the color filter is disposed on the inner surface of the liquid crystal cell. Since a thick transparent substrate is interposed between the liquid crystal layer or the color filter and the transflective film, problems occur, such that a double reflection, a blur in the display, color mixing, etc. caused by parallax are generated, and a sufficient display quality cannot be obtained. Hereinafter, the surface on the liquid crystal layer side of each component of the liquid crystal layer is referred to as the "inner surface", and the surface on the side opposite to the liquid crystal layer is referred to as the "outer surface".

In order to solve this problem, it has been proposed to provide a transflective liquid crystal display with a transflective film disposed on the inner surface side of the liquid crystal cell. FIG. 6 is a cross-sectional view showing one example of these liquid crystal displays. Two glass substrates 604, 612 provided with transparent electrodes 605, 609 are disposed on the inner surfaces facing each other, and a liquid crystal layer 607 is held between the glass substrates 604, 612 via alignment layers 606, 608 to form the liquid crystal cell. A transflective film 611, the color filter 610, the transparent electrode 609 and the alignment layer 608 are successively provided on the inner surface side of the lower glass substrate 612. In this configuration, the liquid crystal layer 607, the color filter 610 and the transflective film 611 are close to each other. The above problems, including the double reflection, the blur and the color mixture, can be solved with this structure.

Further, two retardation films 602, 603 and a polarizer 601 are successively provided on the outer surface side of the upper glass substrate 604.

Various parts to realize the transmissive display are disposed on the outer surface side of the lower glass substrate 612. For example, a ¼ wavelength film 613 and a polarizer 614 are disposed on the outer surface of the lower glass substrate 612, and a backlight is disposed outside thereof. The backlight has a light source 617, a light guide plate 615 and a reflector 616. In the case of the reflective display, one polarizer 601 on the upper side has the functions of both a polarizer and an analyzer. On the other hand, in the case of the transmissive display, the polarizer 614 on the lower side functions as the polarizer, and the polarizer 601 on the upper side functions as the analyzer.

The reason for using the ¼ wavelength film 613 is described below. Firstly, in the case of the reflective display, the light incident from the upper surface side of the liquid crystal cell, and transmitted through the liquid crystal layer, is preferably formed into a circularly polarized wave, or an elliptically polarized wave with high ellipticity, in a dark display condition, and formed into a plane-polarized wave, or an elliptically polarized wave with low ellipticity, in a bright display condition when it is reflected by the transflective film. This is because the circularly polarized wave, or the elliptically polarized wave with high ellipticity, reflected by the transflective film in the dark display condition, is formed into the plane-polarized wave, or the elliptically polarized wave with low ellipticity, orthogonal to the axis of transmission of the polarizer on the upper surface side of the liquid crystal cell through the re-transmission in the liquid crystal layer. This wave is absorbed in the polarizer. The dark display becomes darker, and an excellent contrast characteristic can be realized.

On the other hand, to realize a transmissive mode display similar to that of a reflective mode display, it is necessary that the light from the backlight is in the same polarized state as that in the reflective display when the light is transmitted through the transflective film. Specifically, the light is a circularly polarized wave or an elliptically polarized wave with high ellipticity. Thus, the ¼ wavelength film is disposed between the polarizer and the transflective film to convert the plane-polarized wave after being transmitted through the polarizer into a circularly polarized wave, or an elliptically polarized wave with high ellipticity, when the light is transmitted through the transflective film after being emitted from the backlight.

In the above transflective liquid crystal display, in order to ensure the brightness of the reflective mode display making use of the reflected external light, the area of the aperture is set to be at most 10–25% of the whole area thereof in the case where a transflective film, having an aperture for light transmission, is provided therein, and the external light is reflected by the remaining area. Thus, in the transmissive mode, only a small portion of the light emitted from the backlight, and reaching the transflective film, is transmitted through the transflective film, and the remaining light is reflected by the outer surface side of the transflective film forming a limit to brighten the transmissive display.

On the other hand, there is a demand for a transflective liquid crystal display that brightens even in a transmissive mode, while maintaining the brightness in the reflective mode. However, it is difficult in principle to obtain brightness of both the reflective display and the transmissive display with only a transflective film configuration. In order to brighten the transmissive display while ensuring the brightness of the reflective display to some degree, it is necessary to increase the brightness of the backlight light source. However, to increase the brightness of the light source, the power consumption of the whole liquid crystal display is increased, and in particular, when the liquid crystal display is applied to portable electronic apparatus, etc., a problem occurs in that the battery life is shortened.

SUMMARY OF THE INVENTION

Accordingly, the present invention addresses the above problems, and an object of the present invention is to provide a transflective color liquid crystal display that enables a bright transmissive display and reduces the power consumption, without sacrificing the brightness of the reflective display.

In order to achieve the above object, a liquid crystal display of the present invention is provided that includes a liquid crystal layer that is held between a pair of substrates. A reflective display unit and a transmissive display unit are formed in one pixel. A retardation layer is formed in the transmissive display unit.

In the present invention, the light reflected by a transflective film to the backlight side is the same in the oscillating direction as that of the incident light, and is transmitted therethrough without being absorbed by a polarizer on the lower side of the liquid crystal display. This light is reflected again to the liquid crystal cell side by a reflector of the backlight, and re-used. As a result, the brightness of the transmissive display can be enhanced while maintaining the brightness of the reflective display compared with that of a conventional structure. Alternatively, the power consumption can be reduced, since the brightness of a light source can be reduced if the brightness of the transmissive display is on a certain level.

The retardation layer preferably has retardation of roughly ¼ wavelength. Generally, a ¼ wavelength film means that the retardation layer has a retardation of 140 nm. This retardation is ¼ the wavelength of green light, and the retardation is 100 nm for blue light (a wavelength of 400 nm), and 150 nm for red light (a wavelength of 600 nm), and further, 180 nm for longer wavelength light (a wavelength of 720 nm). Thus, the range provided by the ¼ wavelength film is not less than 100 nm to not more than 180 nm. Uniform retardation of the ¼ wavelength can be easily realized if the retardation layer is formed of a polymer liquid crystal.

An electronic apparatus in accordance with the present invention includes the liquid crystal display described above. In the present invention, an electronic apparatus is realized that has display units that are bright in both the reflective display and the transmissive display and low in power consumption.

BRIEF DESCRIPTION OF THE DRAWINGS

FIG. 1 is a cross-sectional view of a schematic configuration of a transflective liquid crystal display of an embodiment of the present invention;

FIG. 2 is a schematic that shows the configuration from a backlight to a transflective film of the liquid crystal display, and explains the operation of the liquid crystal display;

FIG. 3 is an enlarged schematic of a pixel unit showing an example of the application of the invention to an active matrix liquid crystal display;

FIG. 4 is an enlarged schematic of a pixel unit showing an example of the application of the invention to a passive matrix liquid crystal display;

FIGS. 5(a)–5(c) are perspective views of examples of electronic apparatus provided with the liquid crystal display;

FIG. 6 is a cross-sectional view of a schematic configuration of a conventional transflective color liquid crystal display;

FIG. 7 is a schematic that shows the configuration from a backlight to a transflective film of the conventional liquid crystal display.

DETAILED DESCRIPTION OF PREFERRED EMBODIMENTS

An embodiment of the present invention will be described with reference to the drawings.

FIG. 1 is a cross-sectional view showing the schematic representation of a liquid crystal display of the present embodiment, and in particular, showing an example of a transflective color liquid crystal display. FIG. 1 schematically shows a cross-sectional structure of the liquid crystal display, and the scale, such as the thickness of each member, is different for each member.

In the liquid crystal display of the present embodiment, a liquid crystal cell is formed by disposing two glass substrates 104, 111 having transparent electrodes 105, 109 on each inner surface side facing each other, as shown in FIG. 1, and holding a liquid crystal layer 107 between the glass substrates 104, 111. A transflective film including a reflector 110 and an aperture having a retardation layer 116, a transparent electrode 109, and an alignment layer 108 are successively disposed on the inner surface side of the lower glass substrate 111. Two retardation films 102, 103, and a polarizer 101 are successively disposed on the outer surface side of the upper glass substrate 104. A color filter or the like is omitted in FIG. 1. A transflective film is formed of a metal film provided with a window-like or slit-like aperture and formed of aluminum, silver or an alloy thereof. The retardation layer 116 is provided in the window-like or slit-like aperture. The above configuration (the configuration related to the reflective display) is similar to that of a conventional liquid crystal display.

A polarizer 112 is disposed on an outer surface of the lower glass substrate 111, and a backlight (an illuminating device) is disposed outside thereof. The backlight has a light source 115 including a cold cathode ray tube, a light-emitting diode, etc., a light guide plate 113 and a reflector 114, and a reflective polarizer (omitted in FIG. 1) may be disposed between the light guide plate 113 and the polarizer 112. A regular polarizer has the function of allowing one of the plane-polarized waves in two directions orthogonal to each other to be transmitted therethrough and absorbing the other, while the reflective polarizer has the function of allowing one of the plane-polarized waves to be transmitted and reflecting the other. For example, the reflective polarizer disclosed in Japanese Unexamined Patent Application Publication No. 9-506985 (Brand Name DBEF, manufactured by Sumitomo 3M Ltd.), and the reflective polarizer including a cholesteric liquid crystal film and a ¼ wavelength film disclosed in Japanese Unexamined Patent Application Publication No. 10-319235 (Brand Name PCF, manufactured by Nitto Denko Corp.) can be used.

Some configurations of the pixel units in the liquid crystal display in accordance with the present invention are described below. FIG. 3 is an enlarged schematic of the pixel unit with the present invention applied to an active matrix liquid crystal display using a Thin Film Transistor (TFT) element 303. The TFT element 303 is formed corresponding to each pixel at intersections including a plurality of gate wires 304 and signal wires 305 in every direction. A reflector 301 and an opening part 306 are formed in one pixel, and a retardation layer 302 including a polymer liquid crystal layer is formed in the opening part 306. The retardation layer 302 has a retardation of roughly 140 nm. Alignment layers and transparent electrodes are omitted in the FIG. 3. FIG. 4 is an enlarged schematic of the pixel unit with the present invention applied to a passive matrix liquid crystal display. A reflector 401 and an opening part 403 are formed in one pixel, and a retardation layer 404 including a polymer liquid crystal layer is formed in the opening part 403. The retardation layer 404 has a retardation of roughly 140 nm. An opposing electrode 402 is formed on a proximal side via the liquid crystal layer. Alignment layers, transparent electrodes, color filters, etc. are omitted in FIG. 4.

The operation of the liquid crystal display according to the present embodiment will be described below. However, prior to the description of this operation, the reason why the light reflected by the outer surface of the transflective film cannot be re-used in the conventional liquid crystal display shown in FIG. 6 will be described with reference to FIG. 7. FIG. 7 shows the configuration, including the backlight to the transflective film 611 among the components of the conventional liquid crystal display shown in FIG. 6, and each part is described separately in order to illustrate the polarized state of the light at each point in the optical path. The non-polarized light is emitted from the light source 617 of the backlight, and this light is reflected or scattered by the white reflector 616 on the outer surface of the light guide plate, or a white printing on the surface of the light guide plate, and successively transmitted through the light guide plate 615 and the polarizer 614. If the axis of transmission of the polarizer 614 is perpendicular to the plane of FIG. 7, the light after being transmitted through the polarizer 614 becomes a plane-polarized light in the direction perpendicular to the plane of FIG. 7. Next, when this light is transmitted through the ¼ wavelength film 613, the plane-polarized light in the direction perpendicular to the plane is converted into circularly polarized light, or elliptically polarized light with high ellipticity, due to the operation of the ¼ wavelength film 613, and is transmitted through the glass substrate 612. Thus, a part of the light L1 being transmitted through the transflective film 611 (having the reflective unit 611a and the transmissive unit 611b) is incident on the liquid crystal layer side in a state of circularly polarized light, or elliptically polarized light with high ellipticity, as described with regard to the related art.

On the other hand, most of the light L2 reflected by the outer surface of the transflective film 611 is transmitted through the glass substrate 612, and then, is incident again in the ¼ wavelength film 613 in the state of the circularly polarized light, or the elliptically polarized light with high ellipticity, is transmitted through the ¼ wavelength film 613, and is converted in the plane-polarized light in the direction parallel to the plane of FIG. 7. Next, this light is incident on the polarizer 614. The axis of transmission of this polarizer 614 is in the direction perpendicular to the plane of FIG. 7, and thus, the axis of absorption thereof is in the direction parallel to the plane of FIG. 7. When the plane-polarized light in the direction parallel to the plane of FIG. 7 is incident in the polarizer 614, this light is absorbed by the polarizer 614, and cannot be transmitted through the polarizer 614. Therefore, the light L2 reflected by the transflective film 611 is absorbed by the polarizer 614 in the middle thereof, and cannot reach the backlight, and thus, this light cannot be emitted toward the liquid crystal layer again for re-use.

On the other hand, the operation of the liquid crystal display according to the present embodiment will be explained with reference to FIG. 2. FIG. 2 is a schematic that shows the configuration from the backlight to the transflective film (including a reflector 110 and an aperture having a retardation layer 116) among the components of the liquid crystal display according to the present embodiment shown in FIG. 1. In FIG. 2, similar to FIG. 7, each member is described separately in order to illustrate the polarized state of the light at each point in the optical path. The non-polarized light is emitted from the light source 115 of the backlight, and incident in an end face of the light guide plate 113. This light propagates inside the light guide plate while repeating a total reflection on the inner surface and the outer surface of the light guide plate 113; however, the light is reflected or scattered by the white reflector 114 on the outer surface of the light guide plate 113 and the white printing on the surface of the light guide plate, and is successively transmitted through the polarizer 112 and the glass substrate 111 in a plane-polarized state. Next, when this light is transmitted through the retardation layer 116 formed in the aperture, it is converted into circularly polarized light, or elliptically polarized light L1 with high ellipticity, and incident in the liquid crystal layer side in the state of circularly polarized light, or elliptically polarized light with high ellipticity.

Meanwhile, most of the light L2 reflected by the outer surface of the reflector 110 of the transflective film is reflected in a plane-polarized state, and is transmitted through the polarizer 112 again in the same polarized state, and returns to the backlight. Since this light is reflected to the liquid crystal cell side by the reflector 114 of the backlight, the light reflected to the backlight side by the transflective film can be re-used.

As described above, most of the light L2 reflected by the outer surface of the reflector 110 of the transflective film from a portion of light from the backlight can be efficiently re-used in the liquid crystal display according to the present embodiment, the transflective color liquid crystal display capable of brighter transmissive display can be realized while maintaining the brightness of the reflective display. If a similar brightness to that of a conventional color liquid crystal display is sufficient, the brightness of the light source 115 can be reduced, and power consumption can be reduced.

According to an experiment conducted by the inventors of the present invention, where the brightness of the individual backlight is set to be 100 cd/m$^2$, the brightness of the transmissive display of the conventional liquid crystal display shown in FIG. 6 is 3.0 cd/m$^2$, while it is confirmed that the brightness of the transmissive display of the liquid crystal display according to the present embodiment shown in FIG. 1 is 4.5 cd/m$^2$. In the experiment, the same components of the liquid crystal display of the present embodiment corresponding to those of the conventional liquid crystal display were used. According to the liquid crystal display of the present embodiment, the brightness in the transmissive display can be enhanced to, for example, about 1.5 times the conventional value.

Further, in the present embodiment, if a reflective polarizer with its axis of transmission aligned with that of the polarizer 112 is used between the light guide plate 113 of the backlight and the polarizer 112, the light from the backlight can be introduced in the liquid crystal cell as plane-polarized light more efficiently than a case in which only a regular polarizer is used. Thus, the efficiency of utilization of the light from the light source can be further enhanced.

Examples of the electronic appliances having a liquid crystal display according to the above embodiment will be described below. FIG. 5(a) is a perspective view showing an example of a cellular phone. FIG. 5(b) is a perspective view showing an example of a wrist watch type of electronic apparatus. FIG. 5(c) is a perspective view showing an example of a portable information processing unit, such as a word processor and a personal computer.

The electronic apparatus shown in FIGS. 5(a) to 5(c) are provided with a liquid crystal display unit using the liquid crystal display according to the present embodiment, and have a bright display screen for both the reflective display and the transmissive display, and electronic apparatus that are low in power consumption can be realized.

The technical scope of the present invention is not limited to the above embodiments, and various kinds of modifications can be made to the structures discussed above while not deviating from the intent and object of the present invention. For example, the configuration related to the reflective display on the upper side of the transflective film in FIG. 1 is not limited to that in FIG. 1, and may be appropriately modified.

As described above, most of the light emitted from an illuminating device and reflected on the outer surface side of the transflective film can be re-used efficiently. Thus, the transflective color liquid crystal display capable of being a brighter transmissive display can be realized, while maintaining the brightness of the reflective display. Further, so long as the brightness of the transmissive display to some degree is ensured, the brightness of the light source can be reduced, and the power consumption can be reduced.

What is claimed is:

1. A liquid crystal display, comprising:
   a pair of substrates;
   a liquid crystal layer disposed between the pair of substrates;
   a phase difference layer formed on an internal surface of at least one of the pair of substrates;
   a reflective display region; and
   a transmissive display region, the reflective display region and the transmissive display region being formed in one pixel;
   wherein the retardation layer is formed in a region corresponding to the transmissive display region.

2. The liquid crystal display according to claim 1, said retardation layer having a retardation of roughly ¼ wavelength.

3. The liquid crystal display according to claim 1, the retardation of said retardation layer being roughly in a range between 100 nm and 180 nm.

4. The liquid crystal display according to claim 1, said retardation layer including a polymer liquid crystal.

5. An electronic apparatus, comprising:
   a display unit;
   the liquid crystal display according to claim 1 provided in the display unit.

6. The liquid crystal display according to claim 2, the retardation layer including a polymer liquid crystal.

7. The liquid crystal display according to claim 3, the retardation layer including a polymer liquid crystal.

8. The liquid crystal display according to claim 1, said retardation layer being provided between the pair of substrates.

* * * * *

UNITED STATES PATENT AND TRADEMARK OFFICE
CERTIFICATE OF CORRECTION

PATENT NO.      : 6,831,721 B2
DATED           : December 14, 2004
INVENTOR(S)     : Tsuyoshi Maeda and Osamu Okumura It is certified that error appears in the above-identified patent and that said Letters Patent is hereby corrected as shown below:

<u>Column 8,</u>
Line 6, replace "a phase difference layer" with -- a retardation layer --.

Signed and Sealed this

Seventh Day of March, 2006

JON W. DUDAS
*Director of the United States Patent and Trademark Office*